United States Patent [19]

Bittensky et al.

[11] 3,966,587
[45] June 29, 1976

[54] METHOD FOR CONTROLLING REGENERATOR TEMPERATURE IN A FLUIDIZED CRACKING PROCESS

[75] Inventors: Joel S. Bittensky, Port Arthur; Edward W. Dillingham, Neederland; William R. Menzies, III, Houston; Roy E. Pratt, Groves, all of Tex.

[73] Assignee: Texaco Inc., New York, N.Y.

[22] Filed: Dec. 23, 1974

[21] Appl. No.: 535,408

[52] U.S. Cl.............................. 208/164; 252/417; 252/419
[51] Int. Cl.².......................................... C10G 13/18
[58] Field of Search ............. 208/164; 252/417, 419

[56] References Cited
UNITED STATES PATENTS

| | | | |
|---|---|---|---|
| 2,861,947 | 11/1958 | Nicholson | 252/417 |
| 3,812,029 | 5/1974 | Snyder | 208/164 |
| 3,838,036 | 9/1974 | Stine et al. | 208/164 |

*Primary Examiner*—Herbert Levine
*Attorney, Agent, or Firm*—T. H. Whaley; C. G. Ries; Douglas H. May, Jr.

[57] ABSTRACT

An improved method is disclosed for controlling the temperature of the fluidized dense catalyst phase of the regeneration zone in a fluid catalytic cracking unit, wherein the coke laydown in the reaction zone is at a level such that the coke concentration of the partially deactivated catalyst from the reaction zone is not sufficient to provide the heat required to maintain the controlled temperature in the fluidized dense catalyst phase of the regeneration zone. In this method, torch oil is added to the partially deactivated catalyst in the spent catalyst transfer line in an amount such that the catalyst charged to the regeneration zone contains sufficient combustible material to provide the heat necessary to maintain the fluidized dense catalyst phase of the regeneration zone at the controlled temperature. Also, as a part of this improved method, the flow of oxygen-containing regeneration gas to the regeneration zone is regulated to provide sufficient oxygen to effect substantially complete combustion of the coke and torch oil to carbon dioxide and to provide an oxygen concentration in the regeneration flue gas within the range of from about 1 to about 10 mol%. Maintaining the oxygen concentration in the flue gas within this range results in a flue gas having a carbon monoxide content of about 500 ppm, or less, and preferably 10 ppm or less.

8 Claims, No Drawings

METHOD FOR CONTROLLING REGENERATOR TEMPERATURE IN A FLUIDIZED CRACKING PROCESS

BACKGROUND OF THE INVENTION

This invention relates to an improved process for controlling the temperature in the regeneration zone in a fluid catalytic cracking process. In particular, it is related to a method for maintaining the temperature in the fluidized dense catalyst phase of the regenerator of a fluid catalytic cracking unit (FCCU) having a single fluidized dense catalyst phase wherein coke-contaminated fluidizable catalytic cracking catalyst is contacted with an oxygen-containing regeneration gas in order to obtain a regenerated catalyst having a low carbon content.

The fluidized catalytic cracking of hydrocarbons is well-known in the prior art and may be accomplished using a variety of continuous cyclic processes which employ fluidized solids techniques. In such fluid catalytic cracking processes hydrocarbons are converted under conditions such that substantial portions of a hydrocarbon feed are transformed into desirable products such as gasolne, liquified petroleum gas, alkylation feedstocks and middle distillate blending stocks with concomitant by-product formation of an undesirable nature, such as gas and coke. When substantial amounts of coke deposition occur, reduction in catalyst activity and, particularly, catalyst selectively results thereby deterring hydrocarbon conversion, reducing gasoline production and simultaneously increasing the production of less desired products. To overcome such catalyst deactivation through coke deposition, the partially deactivated coke-contaminated catalyst (hereinafter referred to as spent catalyst) is normally withdrawn from the reaction zone and passed to a stripping zone wherein entrained and absorbed hydrocarbons are initially displaced from the catalyst by means of stripping medium such as steam. The steam and hydrocarbons are removed and the stripped catalyst is passed to a regeneration zone where it is contacted with an oxygen-containing gas to effect combustion of at least a portion of the coke and thereby regenerate the catalyst. Thereafter, the regenerated catalyst is reintroduced to the reaction zone and therein contacted with additional hydrocarbons.

Generally, regeneration processes provide a regeneration zone wherein the spent catalyst is contacted with sufficient oxygen-containing regeneration gas at an elevated temperature to effect combustion of the coke deposits from the catalyst. Most common of the regeneration processes are those wherein the contacting is effected in a fluidized dense catalyst phase in a lower portion of the regeneration zone constituted by passing the oxygen-containing regeneration gas upwardly through the regeneration zone. The space above the fluidized dense catalyst phase contains partially spent regeneration gases and catalyst entrained by the upward flowing regeneration gas. This portion of the regeneration zone is generally referred to as the dilute catalyst phase. The catalyst entrained in the dilute catalyst phase is recovered by gas solid separation cyclones located in the upper portions of the regeneration zone and is returned to the fluidized dense catalyst phase. Flue gas comprising carbon monoxide, other by-product gases obtained from the combustion of the coke deposits, inert gases such as nitrogen and any unconverted oxygen is recovered from the upper portion of the regeneration zone and a catalyst of reduced carbon content is recovered from a lower portion of the regeneration zone.

In the regeneration of catalytic cracking catalyst, particularly high activity molecular sieve type cracking catalysts, it is desirable to burn a substantial amount of coke from the catalyst such that the residual carbon content of the regenerated catalyst is very low. A carbon-on-regenerated-catalyst content of about 0.15 weight percent or less is desirable. Cracking catalysts with such a reduced carbon content enable higher conversion levels within the reaction zone of the FCC unit and improved selectivity to gasoline and other desirable hydrocarbon products.

In the regeneration of catalytic cracking catalyst it is also desirable to operate the regeneration zone under conditions such that the flue gas leaving the regeneration zone have a carbon monoxide concentration of approximately 500 ppm or less so that the flue gas may be discharged into the atmosphere without additional treatment.

In order to obtain low carbon-on-regenerated-catalyst contents of about 0.15 wt.% or less, and a regeneration flue gas having a low carbon monoxide content, it is necessary to operate the fluidized dense catalyst phase of the regeneration zone at a temperature of from about 1275°F. to about 1450°F. and provide oxygen-containing regeneration gas in an amount sufficient to effect combustion of the coke to carbon dioxide and to provide from about 1 to about 10 mol% oxygen in the flue gas in order to reduce the carbon monoxide concentration in the flue gas to the levels herein indicated.

It frequently occurs in FCCU operations, that a particular desired operating condition will result in a spent catalyst being recovered from the reaction zone, which has a coke concentration that is not sufficient to provide the necessary heat, when burned in the regeneration zone, to maintain the fluidized dense catalyst phase at the controlled operating temperature. For example, a FCCU unit may be operated such that the regeneration zone is maintained at relatively high temperatures necessary to effect the substantially complete combustion of coke from the spent catalyst and to provide a regeneration flue gas with a carbon monoxide concentration of 500 ppm or less. Because of the high temperature and activity of the regenerated catalyst, it may be necessary to decrease the catalyst-oil ratio (lb. cat./lb. oil) in the transport reaction zone to maintain the desired conversion level. Under such conditions with high activity catalyst, such as zeolitic molecular sieves, the coke laydown on the catalyst in the reaction zone may not be great enough to provide sufficient heat, upon combustion in the regeneration zone, to maintain the operating temperature of the fluidized dense catalyst phase at the controlled temperature.

Also, when a FCCU unit is operated with pure riser cracking, the coke concentration of the spent catalyst is generally lower than in conventional FCCU operations. Therefore, it may be necessary to add other combustible materials to the regeneration zone in order to maintain the desired operating temperature. Still another operating condition wherein additional heat must be added to the regeneration zone, involves the cracking of light hydrocarbon feedstocks, such as naphtha, in which the coke laydown on the catalyst in the reaction zone is lower than in conventional FCCU operations.

Known methods for providing this additional heat in the regeneration zone generally involve injecting torch oil or other combustible materials by means of a nozzle or a plurality of nozzles directly into the fluidized dense catalyst phase of the regeneration zone. Such methods are unsatisfactory in that hot spots are created in the fluidized dense catalyst phase around the area where the torch oil or other combustible materials is injected into the regeneration zone. The temperatures within these hot spots generally exceed about 1500°F. and may exceed about 1800°F. or higher. Such high temperatures are deleterious to the catalyst and result in a permanent loss of catalytic activity, thus necessitating an inordinately high rate of catalyst addition or replacement to the process in order to maintain a desired level of catalytic activity in the hydrocarbon reaction zone.

Whenever a regenerator is operated within the range of operating conditions herein described, it is important to control the temperature of the fluidized dense catalyst phase in the regenerator in order to maintain the desired operating conditions in the reaction zone and in order to avoid uncontrolled afterburning in the dilute catalyst phase of the regeneration zone.

By after-burning is meant the further oxidation of carbon monoxide to carbon dioxide in the dilute catalyst phase. Whenever after-burning occurs in the dilute catalyst phase, it is generally accompanied by a substantial increase in the temperature due to the large quantities of heat liberated. In such circumstances the dilute phase temperature may exceed about 1500°F. and, in severe cases, may increase to about 1800°F. or higher. Such high temperatures in the dilute catalyst phase are deleterious to the entrained catalyst present in the dilute catalyst phase and result in a permanent loss of catalytic activity, thus necessitating an inordinately high rate of catalyst addition or replacement to the process in order to maintain a desired level of catalytic activity in the hydrocarbon reaction zone. Such high temperatures are additionally undesirable because of the damage which may result to the mechanical components of the regeneration zone, particularly to cyclone separators employed to separate the entrained catalyst from the flue gas.

It is known that commonly employed catalytic cracking catalysts such as amorphous silica-alumina, silica-alumina zeolitic molecular sieves, silica-alumina zeolitic molecular sieves ion-exchanged with divalent metal ions, rare earth metal ions, etc., and mixtures thereof, are adversely affected by exposure to excessively high temperatures. At temperatures of approximately 1500°F. and higher, the structure of such catalytic cracking catalyst undergo physical change, usually observeable as a reduction in the surface area with resulting substantial decrease in catalytic activity. Consequently, it is desirable to maintain the temperatures within the regeneration zone at levels below which there is any substantial physical damage to the catalyst.

SUMMARY OF THE INVENTION

Now, according to the present invention, an improved method has been discovered for maintaining the temperature of the fluidized dense catalyst phase of the regeneration zone of a fluidized catalytic cracking unit at a desired controlled temperature by adding torch oil or other combustible material to the spent catalyst being transferred from the stripping zone to the regeneration zone. Preferably, torch oil or other combustible material is admixed with the spent catalyst in a gravity flow spent catalyst transfer line at a rate required to maintain the regeneration zone fluidized dense catalyst phase temperature at the desired controlled temperature. In this manner the temperature of the regeneration zone fluidized dense catalyst phase is maintained at a controlled temperature in the range of from about 1050°F. to about 1450°F. while avoiding the formation of hot spots that result from the direct introduction of torch oil into the regeneration zone.

In the process of the instant invention the torch oil is intimately mixed with the spent catalyst in the spent catalyst transfer line. In this manner, the torch oil is evenly distributed over the catalyst surface with the result that in the regeneration zone the torch oil and other coke deposits are burned in the presence of the oxygen-containing regeneration gas at temperatures which do not exceed about 1455°F. Thus, the problems associated with hot spots and the resulting deactivation of the catalyst is avoided. By practicing the method of the present invention, it is also possible to effect changes in the regenerator fluidized dense catalyst phase temperature without making a corresponding increase in the coke yield on the catalyst in the reaction zone. It is therefore possible to make changes in the regeneration zone operating conditions while maintaining the reaction zone at constant reaction conditions.

In the process of this invention the oxygen-containing regeneration gas is supplied to the regeneration zone in an amount such that there is sufficient oxygen to effect substantially complete combustion of the torch oil and the coke deposits on the catalyst and to provide a regenerated catalyst with carbon-on-regenerated-catalyst content of about 0.3 weight percent, or less. In a preferred embodiment of the process of this invention, the oxygen-containing regeneration gas is provided in an amount to effect the substantially complete combustion of torch oil and coke deposits to carbon dioxide and to provide a regeneration flue gas with an oxygen concentration within the range of from about 1 to about 10 mol%, and preferably in the range of from about 3 to about 10 mol%. With an oxygen concentration within this range, and a residence time for the catalyst in the regeneration zone fluidized dense catalyst phase of at least about 3 minutes, a flue gas is obtained having a carbon monoxide concentration of from about 0 to about 500 ppm, and preferably from about 0 to about 10 ppm. The residence time of the catalyst in the fluidized dense catalyst phase is adjusted to provide a regenerated catalyst with a low level of residual carbon-on-regenerated-catalyst, preferably about 0.15 weight percent or less.

DETAILED DESCRIPTION OF THE INVENTION

According to the process of this invention, a fluidizable catalytic cracking catalyst which has been partially deactivated by the deposition of carbonaceous deposits upon the surface thereof (hereinafter referred to as spent catalyst) in a fluidized catalytic cracking process, is introduced into a fluidized dense catalyst phase of a regeneration zone wherein it is contacted with an oxygen-containing regeneration gas for the purpose of burning the carbonaceous deposits from the catalyst thereby to restore its activity. The regeneration zone generally comprises a regeneration vessel, in which there is a fluidized dense catalyst phase in the lower portion thereof and a dilute catalyst phase in the upper portion thereof. The oxygen-containing regeneration gas is introduced into the lower portion of the regeneration zone thereby to maintain the catalyst in a fluidized dense catalyst state. A flue gas is recovered from the top of the regeneration zone comprising carbon monoxide and other by-products of the combustion of the coke deposits contained on the spent catalyst.

The fluidized dense catalyst phase is generally maintained at a density of from about 10 to about 60 lb/ft$^3$ and preferably at a density of from about 20 to about 40 lb/ft$^3$ by the upward flow of the oxygen-containing regeneration gas, which is introduced at a lower portion in the regeneration zone. The catalyst in the lower portion of the regeneration zone is maintained in a fluidized dense catalyst phase in order to obtain good heat transfer throughout the bed and to avoid localized hot spots and their concomitant high temperatures, which are known to adversely affect the catalyst. In order to maintain the catalyst in a fluidized state, a specific vapor velocity of the regeneration gas of from about 0.2 to about 6.0 ft./sec. is generally maintained. The regeneration vessel is generally sized to provide a specific vapor velocity within the aforementioned range when operating with the desired residence time for the catalyst in the regeneration zone and with the required amount of oxygen-containing regeneration gas to effect the combustion of the coke from the catalyst in the reaction zone. Additionally, it is possible to control the specific vapor velocity within the desired range by employing an operating pressure within the regeneration zone within the range of from about 1 to about 50 psig, and preferably from about 15 to about 45 psig. If, within these operating parameters, there is nevertheless insufficient oxygen-containing regeneration gas to provide the desired specific vapor velocities, steam or an inert diluent gas may be combined with the oxygen-containing regeneration gas to provide the desired specific vapor velocity.

The spent catalyst is introduced into the fluidized dense catalyst phase, which is generally maintained at a temperature in the range of from about 1050°F. to about 1450°F., and is therein contacted with sufficient oxygen-containing regeneration gas to burn the coke deposits from the catalyst.

Preferably, the temperature of the fluidized dense catalyst phase of the regeneration zone is maintained at a temperature in the range of from about 1275°F. to about 1450°F., in order to provide a flue gas which contains carbon monoxide in an amount of about 500 ppm or less and does not require additional treatment prior to discharge into the atmosphere. In view of environmental considerations, it is important that the concentration of carbon monoxide which is known to be a severe air pollutant be maintained at as low a level as possible in the regeneration flue gas. In the process of this invention, carbon monoxide concentrations in the regeneration flue gas may be maintained at 500 ppm or less and generally at 10 ppm or less, without additional treatment of the regeneration flue gas.

At a fluidized dense catalyst phase temperature in the range of from about 1350°F. to about 1450°F., and preferably within the range of about 1375°F. to about 1450°F., and sufficient volume of fluidized dense catalyst phase to provide a catalyst residence time within the fluidized dense catalyst phase of from about 3 to about 10 minutes, coke is burned from the spent catalyst in a manner such that all of the carbon monoxide formed in the combustion process is converted to carbon dioxide in the fluidized dense catalyst phase. Therefore, operating the regenerator fluidized dense catalyst phase within these temperatures avoids afterburning in the dilute catalyst phase.

Operating the regenerator with a fluidized dense catalyst phase at a temperature in the range of from about 1275°F. to about 1350°F., and preferably in the range of from about 1300°F. to about 1350°F., and with a catalyst residence time of from about 3 to about 10 minutes in the fluidized dense catalyst phase, the combustion of coke from the spent catalyst is effected such that there is a controlled afterburn of carbon monoxide in the dilute catalyst phase. By controlled afterburn is meant effecting combustion of the coke from the partially spent catalyst in the fluidized dense phase of the regeneration zone such that the combustion of carbon monoxide to carbon dioxide is initiated in the fluidized dense catalyst phase and is completed in the dilute catalyst phase with only a moderate increase in temperature, such that the temperature in the dilute catalyst phase of the regeneration zone does not exceed about 1455°F. This controlled afterburn is accomplished by controlling the amount of carbon monoxide in the regeneration gases leaving the fluidized dense catalyst phase such that the temperature in the dilute catalyst phase is in the range of from about 1375°F. to about 1455°F., and preferably from about 1400°F. to about 1455°F.

In the process of this invention, the temperature of the fluidized dense catalyst phase of the regeneration zone is maintained at the desired controlled temperature in the range herein described by adding torch oil to the spent catalyst in the spent catalyst transfer line to provide a catalyst-torch oil mixture with a total carbon content such that, upon combustion of the torch oil and coke in the spent catalyst in the regeneration zone, enough heat is provided to maintain the fluidized dense catalyst phase temperature at the desired control temperature.

The process of this invention ia applicable to any FCCU operating condition wherein the coke concentration of the spent catalyst is not sufficient to provide the heat necessary to maintain the regeneration zone fluidized dense catalyst phase temperature at the desired control temperature. In one application of the instant invention, the employment of high activity molecular sieve catalyst with very low residual carbon contents will necessitate an adjustment of the weight hourly space velocity (lb. oil/hr./lb. catalyst) above the riser discharge in the reaction vessel to control the conversion to the desired level. A weight hourly space velocity (WHSV) of up to about 5.0 lb. oil/hr./lb. catalyst, or higher, is not uncommon. At such space velocities, the coke laydown on the catalyst in the reaction zone may not be sufficient to maintain the high regeneration zone temperatures employed in order to obtain a flue gas having a low carbon monoxide content. For example, a coke concentration on the spent catalyst entering the regeneration zone of from about 0.9 to about 1.1 weight percent is required in order to provide sufficient heat in the regeneration zone to maintain a fluidized dense catalyst phase temperature in the range of from about 1275°C. to about 1450°F.

In another application of the instant invention, a FCCU unit may be operated as a pure riser cracking process. In such operations, most of the cracking occurs in the transport riser reaction zone, and the reaction vessel is employed to separate the cracking catalyst and the hydrocarbon charge as quickly as possible.

The amount of coke laydown on the partially spent catalyst obtained in such operations is generally lower than in conventional FCCU operations. Therefore, additional combustible material must be added to the regeneration zone in order to maintain a fluidized dense catalyst phase temperature, as herein described. Still another application of the instant invention, involves employing a light hydrocarbon feedstock, e.g. naphtha, as the FCCU feedstock. The cracking of light hydrocarbon feedstocks results in less coke being deposited on the catalyst in the reaction zone and, therefore, necessitates the addition of combustible material to the spent catalyst entering the regeneration zone in order to maintain the high regeneration zone temperatures as herein indicated.

In all of the above applications of the process of this invention, the amount of torch oil or other combustible material, which is added to the catalyst transfer line and is admixed with the partially deactivated catalyst, is adjusted to effect the desired temperature in the fluidized dense catalyst phase of the regeneration zone. The process of this invention may be employed not only to maintain a desired operating controlled temperature in the fluidized dense catalyst phase of the regeneration zone, but also to effect a change in the operating temperature of the fluidized dense catalyst phase of the regeneration zone without requiring any change in the operating conditions within the reaction zone.

The amount of oxygen-containing regeneration gas necessary in the practice of the process of this invention will depend upon the amount of torch oil being added to the partially deactivated catalyst and th amount of coke contamination on the catalyst. Generally, the oxygen-containing regeneration gas is provided in an amount sufficient to effect the substantially complete combustion of torch oil and coke to carbon dioxide and to provide an oxygen concentration in the regeneration flue gas in the range of from about 1 to about 10 mol%, and preferably from about 3 to about 10 mol%.

The oxygen-containing regeneration gas which may be employed in practicing the process of this invention includes gases which contain molecular oxygen in admixture with other inert gases. Air is a particularly suitable regeneration gas. Additional gases which may be employed include oxygen in combination with carbon dioxide and/or other inert gases. Additionally, if desirable, steam may be added as a part of the regeneration gas mixture.

In practicing the method of the present invention to obtain a regenerated catalyst having a carbon-on-regenerated-catalyst content of about 0.15 weight percent or less, it is necessary to maintain the spent catalyst in the fluidized dense catalyst phase at the aforementioned conditions for a period of from about 3 to about 10 minutes. Of course, longer residence times may be employed, although generally there is no advantage in so doing. It is an advantage of the process of the present invention that catalyst residence times in the regeneration zone may be substantially decrease over residence times employed in other prior art processes. Thus, it is possible to operate the process of this invention at a substantially reduced catalyst inventory within the fluidized catalytic cracking unit. The residence time of the catalyst within the fluidized dense catalyst phase of the regeneration zone is controlled by adjustment of the amount of catalyst, and hence, the depth of the fluidized dense catalyst phase within the regeneration zone.

This invention will now be further illustrated in the following example which is not to be considered as a limitation on the scope of the invention.

EXAMPLE 1

A continuous fluidized catalytic cracking process was operated in a pilot unit wherein hydrocarbon charge and fresh regenerated catalyst were combined in the lower portion of a transport riser reaction zone and wherein catalyst and hydrocarbon vapor discharged from the top of said riser into a reaction vessel. The fluidized catalytic cracking unit employed a transport riser cracking zone and the gas oil charge is cracked on a once through basis. From the reaction vessel spent catalyst was continuously withdrawn into a stripping section, wherein strippable hydrocarbon vapors were removed from the catalyst by the stripping action of steam. From the stripping section spent catalyst was continuously transferred by gravity flow through a catalyst transfer line into a regeneration vessel. The regeneration vessel comprised an upright cylndrical vessel having means for introducing spent catalyst continuously thereto, means for withdrawing regenerated catalyst, a sparger near the bottom for the introduction of oxygen-containing regeneration gas, e.g., air, a cyclone separator near the top of said vessel for the separation of catalyst from the flue gas resulting from the regeneration of the catalyst and a vent pipe for removing flue gas from the regeneration vessel. The regeneration vessel was equipped with valves, piping, thermocouples, pressure gauges, sample taps and flow measuring devices necessary to obtain the data shown in this example. In this example, spent catalyst from the reaction zone at a temperature of about 950°F. was continuously added to the regeneration vessel through a catalyst entry nozzle. In the regeneration vessel the catalyst was maintained in a fluidized dense catalyst phase by the upward flowing oxygen-containing regeneration gas introduced into the lower portion of the regeneration zone.

Catalyst employed in this example was an ion-exchanged silica-alumina zeolitic molecular sieve catalyst as manufactured by Davison Chemical Company under the trandename "CBZ-1". Equilibrium catalyst obtained from a commercial FCCU was employed at start up of the FCCU and fresh catalyst was added on a regular basis to maintain equilibrium activity.

Initially the unit was lined out with a fluidized dense catalyst phase temperature in the regeneration zone of 1048°F. The catalyst-oil ratio in the transport riser conduit was then set to establish a riser outlet temperature of 948°F., which resulted in a conversion level of 80.09 vol.%. After establishing steady state operation at these conditions, the regeneration zone of the FCCU was then converted to a high temperature regeneration process with a fluidized dense catalyst phase temperature of approximately 1400°F. This was accomplished by the addition of torch oil to stripped spent catalyst in the spent catalyst transfer line prior to its entry into the regeneration zone. As the torch oil was charged to the unit, the fluidized dense catalyst phase temperature of the regeneration zone increased and the catalyst-oil ratio in the riser reaction zone was decreased in order to maintain a constant riser discharge temperature and substantially constant conversion level. The torch oil rate was increased until the fluidized dense catalyst phase temperature was 1400°F. While the torch oil ratio was being increased, the oxygen-containing regeneration gas rate was also increased to provide sufficient oxygen to effect substantially complete combustion of the torch oil and coke on the spent catalyst to carbon dioxide and to provide a regeneration flue gas with an oxygen concentration in the range of from about 1 to about 10 mol%. At a fluidized dense catalyst phase temperature of approximately 1400°F. essentially all of the carbon monoxide formed in the fluidized dense catalyst phase is burned to carbon dioxide in the fluidized dense catalyst phase.

The torch oil was injected into the spent catalyst transfer line connecting the lower portion of the stripping zone with the regeneration zone. In this catalyst transfer line, the torch oil and spent catalyst were intimately mixed prior to entry into the regeneration zone wherein contact was made with the oxygen-containing regeneration gas. The temperature of the fluidized dense catalyst phase increased smoothly as the torch oil rate was increased and no hot spots were detected within the regeneration zone.

The torch oil employed was a heavy cycle gas oil obtained by distillation of the hydrocarbon product of the reaction zone. However, other hydrocarbon materials may be employed as torch oil, including, for example, intermediate cycle oil, fresh hydrocarbon feed, and the like. Of course, the amount of torch oil which will be required, will depend upon the heat content upon combustion of the particular torch oil employed.

The charge stock employed in this example was a refinery virgin gas oil FCCU charge. The operating conditions and analytical test results for the two runs are shown in Table 1, following.

Table 1

| OPERATING CONDITIONS OF TEST RESULTS | | |
|---|---|---|
| Run No. | 1 | 2 |
| Gas-Oil Charge (ltr./hr.) | 18.32 | 18.32 |
| Torch Oil (ltr./hr., | — | 0.5 |
| wt.% of Charge) | — | 3.05 |
| Riser Inlet Temp., °F. | 698 | 698 |
| Riser Outlet Temp., °F. | 948 | 948 |
| Regen. Bed Temp., °F. | 1048 | 1400 |
| Conversion (Vol.%) | 80.09 | 80 |
| Coke Yield (wt.% Charge) | 5.33 | 1.60 |
| Catalyst to Oil Ratio (wt.) | 18.2 | 4.5 |
| D.B. Naphtha Yield (Vol.% Charge) | 61.37 | 64.85 |

From an examination of the data in the foregoing table, it was demonstrated that by increasing the fluidized dense catalyst phase temperature from 1048°F. to 1400°F., while maintaining the conversion level constant at approximately 80 vol.% of the gas oil feed, the coke yield decreased from 5.33 weight percent to 1.60 weight percent, based on the FCCU charge, and the naphtha yield increased by 3.5 vol.%.

At a coke yield of 1.6 weight percent, there was not sufficient carbon present on the spent catalyst being introduced into the regeneration zone to supply enough heat, when burned, to maintain the fluidized dense catalyst phase temperature of the regeneration zone at the desired control temperature of 1400°F. Therefore, it was necessary to add torch oil in an amount which, when the unit lined out, amounted to 3.05 weight percent of the fresh feed. The torch oil was a heavy cycle gas oil product of the cracking process. The net effect of this change of operating condition was to consume an amount of heavy cycle gas oil in the regeneration zone approximately equal to the additional naphtha produced in the reaction zone.

For units employing only a riser transport reactor, the catalyst to oil ratio must be decreased to maintain a constant riser outlet temperature as the fluidized dense catalyst phase temperature of the regeneration zone is increased. Consequently, the amount of coke produced in the reaction zone will decrease greatly. Where, as in this example, the amount by which the coke yield is reduced is such that there is not sufficient coke on the spent catalyst to sustain the controlled temperature of fluidized dense catalyst phase in the regeneration zone, torch oil is added to provide the additional fuel required to maintain the desired controlled temperature in the fluidized dense catalyst phase. By injecting the torch oil into the spent catalyst transfer line, as taught in the instant invention, the torch oil is intimately admixed with the spent catalyst with the result that in burning the coke deposits and torch oil from the catalyst in the fluidized dense phase of the regeneration zone, hot spots do not develop. The temperature within the fluidized dense catalyst phase of the regeneration zone is substantially uniform and damage to the catalyst from excessively high temperatures is thereby avoided.

From the foregoing disclosure and example, many modifications and variations will appear obvious to those skilled in the art. All such variations and modifications are to be included in the present invention and no limitations are intended except those included within the appended claims.

We claim as our invention:

1. In a continuous fluidized catalytic cracking process wherein hydrocarbon charge stock is contacted with regenerated catalyst under cracking conditions in a riser transport reaction zone, wherein catalyst and hydrocarbon discharge from said riser into a reaction vessel for separation into a hydrocarbon vapor phase and a fluidized dense phase of coke-contaminated spent catalyst, wherein volatile hydrocarbon is stripped from said spent catalyst in a stripping zone, wherein spent catalyst from said stripping zone is transferred to a regeneration zone, comprising a fluidized dense catalyst phase maintained at a controlled temperature in the range of from about 1050°F. to about 1450°F. in the lower portion of said regeneration zone, and a dilute catalyst phase in the upper portion of said regeneration zone, wherein said coke-contaminated spent catalyst is contacted with an oxygen-containing regeneration gas for a controlled residence time in said fluidized dense catalyst phase for combustion of coke from said catalyst and production of a flue gas, and wherein the coke content of the spent catalyst is insufficient for providing heat required to maintain the regeneration zone fluidized dense catalyst phase at said controlled temperature; the improvement which comprises:

a. intimately mixing torch oil with said coke-contaminated spent catalyst being transferred from said stripping zone to said regeneration zone in an amount to provide sufficient combustible material in said regeneration zone to maintain the fluidized dense catalyst phase at a regeneration zone controlled temperature in the range of about 1275°F to about 1450°F while avoiding localized temperatures in said fluidized dense catalyst phase that are substantially higher than said controlled fluidized dense catalyst phase temperature;

b. adjusting the flow rate of said oxygen-containing regeneration gas to provide oxygen to effect substantially complete combustion of coke and torch oil to carbon dioxide and to provide in the range of from about 1 to about 10 mol% oxygen in the flue gas; and c. maintaining catalyst in the regeneration zone fluidized dense catalyst phase for a residence time in the range of from about 3 minutes to about 10 minutes for maintaining the temperature of said regeneration zone dilute catalyst phase below about 1500°F., maintaining the carbon monoxide concentration of the regeneration flue gas in the range of from about 0 to about 500 ppm, and maintaining the carbon-on-regenerated-catalyst content in the range of from about 0 to about 0.15 wt.%.

2. The process of claim 1 wherein cracking of said hydrocarbon charge stock is substantially completely accomplished in said riser transport reaction zone.

3. The process of claim 2 wherein said hydrocarbon charge comprises a substantial proportion of naphtha hydrocarbons deficient in coke forming components.

4. The process of claim 1 wherein the oxygen-containing regeneration gas rate is adjusted to provide oxygen to effect substantially complete combustion of the coke and torch oil to carbon dioxide and the provide from about 3 to about 10 mol% oxygen in the flue gas for maintaining the carbon monoxide concentration of the flue gas in the range of from about 0 to about 10 ppm and maintaining the carbon-on-regenerated-catalyst content in the range of from about 0 to about 0.12 weight percent.

5. The process of claim 4 wherein cracking of the hydrocarbon charge stock is substantially completely accomplished in said riser transport reaction zone.

6. The process of claim 5 including gravity flow transfer of spent catalyst from said stripping zone to said regeneration zone.

7. The process of claim 5 wherein said hydrocarbon charge stock comprises a substantial proportion of naphtha hydrocarbons deficient in coke forming components.

8. The process of claim 5 including gravity flow transfer of spent catalyst from said stripping zone to said regeneration zone.

* * * * *